United States Patent
Cyr et al.

(10) Patent No.: US 10,153,523 B2
(45) Date of Patent: Dec. 11, 2018

(54) TRACTION BATTERY THERMAL MANAGEMENT METHOD AND SYSTEM

(71) Applicant: FORD GLOBAL TECHNOLOGIES, LLC, Dearborn, MI (US)

(72) Inventors: Steven Michael Cyr, Lake Orion, MI (US); Ray C. Siciak, Ann Arbor, MI (US); Allen Dennis Dobryden, Ann Arbor, MI (US); Michael Reibling, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

(21) Appl. No.: 15/139,744

(22) Filed: Apr. 27, 2016

(65) Prior Publication Data
US 2017/0317392 A1 Nov. 2, 2017

(51) Int. Cl.
*H01M 10/617* (2014.01)
*H01M 10/625* (2014.01)
*H01M 10/63* (2014.01)
*H01M 10/6556* (2014.01)
*B60L 11/18* (2006.01)
*H01M 10/48* (2006.01)

(52) U.S. Cl.
CPC ......... *H01M 10/617* (2015.04); *B60L 11/187* (2013.01); *H01M 10/486* (2013.01); *H01M 10/625* (2015.04); *H01M 10/63* (2015.04); *H01M 10/6556* (2015.04); *H01M 2220/20* (2013.01)

(58) Field of Classification Search
CPC .. H01M 10/617; H01M 10/625; H01M 10/63; H01M 10/6556; H01M 10/486; H01M 2220/20; B60L 11/187
See application file for complete search history.

(56) References Cited

U.S. PATENT DOCUMENTS

| | | | |
|---|---|---|---|
| 4,594,991 A | 6/1986 | Harvey | |
| 5,730,237 A | 3/1998 | Matsuki et al. | |
| 8,601,811 B2 | 12/2013 | Pursifull et al. | |
| 8,851,055 B2 | 10/2014 | Martini et al. | |
| 9,728,826 B2 * | 8/2017 | Lear .................... | H01M 10/625 |
| 2011/0206951 A1 | 8/2011 | Ford et al. | |
| 2013/0280561 A1 | 10/2013 | Tolkacz et al. | |

OTHER PUBLICATIONS

U.S. Appl. No. 14/732,042, filed Jun. 5, 2015.

* cited by examiner

*Primary Examiner* — Anthony R. Jimenez
*Assistant Examiner* — Paul Baillargeon
(74) *Attorney, Agent, or Firm* — Carlson, Gaskey & Olds, P.C.

(57) ABSTRACT

An exemplary method includes circulating a fluid along a fluid circuit that extends through a heat exchanger and a battery pack, and, during the circulating, heating the fluid with a flow of exhaust gas and using the fluid to heat the battery pack. An exemplary vehicle system includes a battery pack, a heat exchanger, a fluid circuit configured to circulate a fluid between the battery pack and the heat exchanger, and a valve moveable back and forth between a heating position and a cooling position. The valve in the heating position permits more flow along an exhaust circuit to heat the fluid in the fluid circuit than the valve in the cooling position.

17 Claims, 3 Drawing Sheets

TRACTION BATTERY THERMAL MANAGEMENT METHOD AND SYSTEM

TECHNICAL FIELD

This disclosure relates to managing thermal energy levels of a traction battery and, more particularly, to selective heating of the traction battery using an exhaust flow.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Traction batteries of electrified vehicles have an optimal operating temperature range. Operating the traction battery within the optimal operating temperature range can, among other things, improve the operational efficiency of the traction battery. Heating or cooling the traction battery can be required to bring the traction battery within the optimal operating temperature range.

SUMMARY

A method according to an exemplary aspect of the present disclosure includes, among other things, circulating a fluid along a fluid circuit that extends through a heat exchanger and a battery pack, and, during the circulating, heating the fluid with a flow of exhaust gas and using the flow to heat the battery pack.

A further non-limiting embodiment of the foregoing method includes communicating the flow of exhaust gas along an exhaust circuit when the flow of exhaust gas is heating the fluid.

A further non-limiting embodiment of any of the foregoing methods includes the exhaust circuit extending from an exhaust gas heat recovery device to the fluid circuit.

A further non-limiting embodiment of any of the foregoing methods includes actuating a valve to control the flow of exhaust gas from an exhaust conduit to the exhaust gas heat recovery device. The valve is positioned at least partially within the exhaust conduit.

A further non-limiting embodiment of any of the foregoing methods includes actuating a valve to control the flow of exhaust gas along the exhaust circuit. The valve is positioned within the exhaust gas heat recovery device.

A further non-limiting embodiment of any of the foregoing methods includes the exhaust circuit having a portion coiled about a portion of the fluid circuit.

A further non-limiting embodiment of any of the foregoing methods includes the fluid circuit following the same path when the fluid is heating the battery pack and when the fluid is cooling the battery pack.

A further non-limiting embodiment of any of the foregoing methods includes selectively cooling the battery pack using the fluid without heating the fluid using the flow.

A further non-limiting embodiment of any of the foregoing methods includes removing thermal energy from the fluid at the heat exchanger during the cooling.

A further non-limiting embodiment of any of the foregoing methods includes heating the fluid with the exhaust gas using an air to liquid heat exchange device.

A further non-limiting embodiment of any of the foregoing methods includes heating the fluid at a position downstream from the heat exchanger and upstream from the battery pack relative to a direction of fluid circulation along the fluid circuit.

A further non-limiting embodiment of any of the foregoing methods includes powering a drive wheel of an electrified vehicle using power from the battery pack.

A further non-limiting embodiment of any of the foregoing methods includes the fluid as a liquid.

A vehicle system according to another exemplary aspect of the present disclosure includes, among other things, a battery pack, a heat exchanger, a fluid circuit configured to circulate a fluid between the battery pack and the heat exchanger, and a valve moveable back and forth between a heating position and a cooling position. The valve in the heating position permits more flow along an exhaust circuit to heat the fluid in the fluid circuit than the valve in the cooling position.

In a further non-limiting embodiment of the foregoing system, the fluid circuit is configured to circulate fluid between the battery pack and the heat exchanger when the valve is in the heating position and when the valve is in the cooling position.

In a further non-limiting embodiment of any of the foregoing systems, the valve in the heating position permits an exhaust gas to flow from an exhaust gas heat recovery device to a location near the fluid circuit.

In a further non-limiting embodiment of any of the foregoing systems, the location is upstream from the heat exchanger and downstream from the battery pack relative to a direction of fluid circulation along the fluid circuit.

In a further non-limiting embodiment of any of the foregoing systems, the valve is a first valve disposed within an exhaust conduit, and the system further includes a second valve disposed outside the exhaust conduit. The second valve is configured to actuate back and forth between a first position and a second position. The second valve in the first position permits more flow through the exhaust circuit to the location than the second position.

In a further non-limiting embodiment of any of the foregoing systems, the second valve is within an exhaust gas heat recovery device.

In a further non-limiting embodiment of any of the foregoing systems, the battery pack is a traction battery pack that powers a drive wheel of an electrified vehicle.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to heating and cooling a battery pack of an electrified vehicle. During operation, a fluid is circulated along a fluid circuit extending through the battery pack and a heat exchanger. When heating the battery pack is desired, exhaust gas from an internal combustion engine is moved through an exhaust circuit. Thermal energy from the exhaust gas within the exhaust circuit heats the fluid within the fluid circuit. When cooling the battery pack is desired, at least some of the exhaust gas is blocked from moving through the exhaust circuit.

Figure 1:
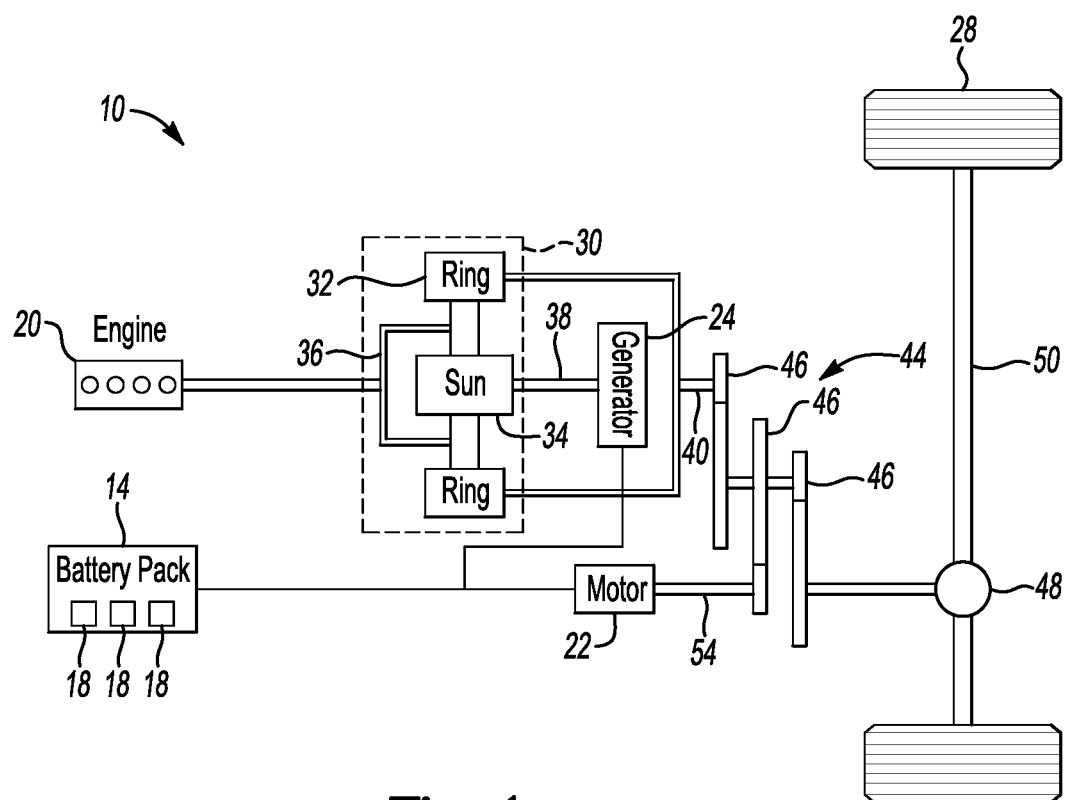
FIG. 1 schematically illustrates an example powertrain of a hybrid electric vehicle.

Referring to FIG. 1, a powertrain 10 of a hybrid electric vehicle (HEV) includes a battery pack 14 having a plurality of arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

The arrays 18 of the battery pack 14 include battery cells. Operating the battery cells and other portions of the battery pack 14 within an optimal temperature range can, among other things, facilitate efficient operation. The optimal temperature range for some types of battery packs 14 can be from 20 to 40 degrees Celsius, for example.

Figure 2:
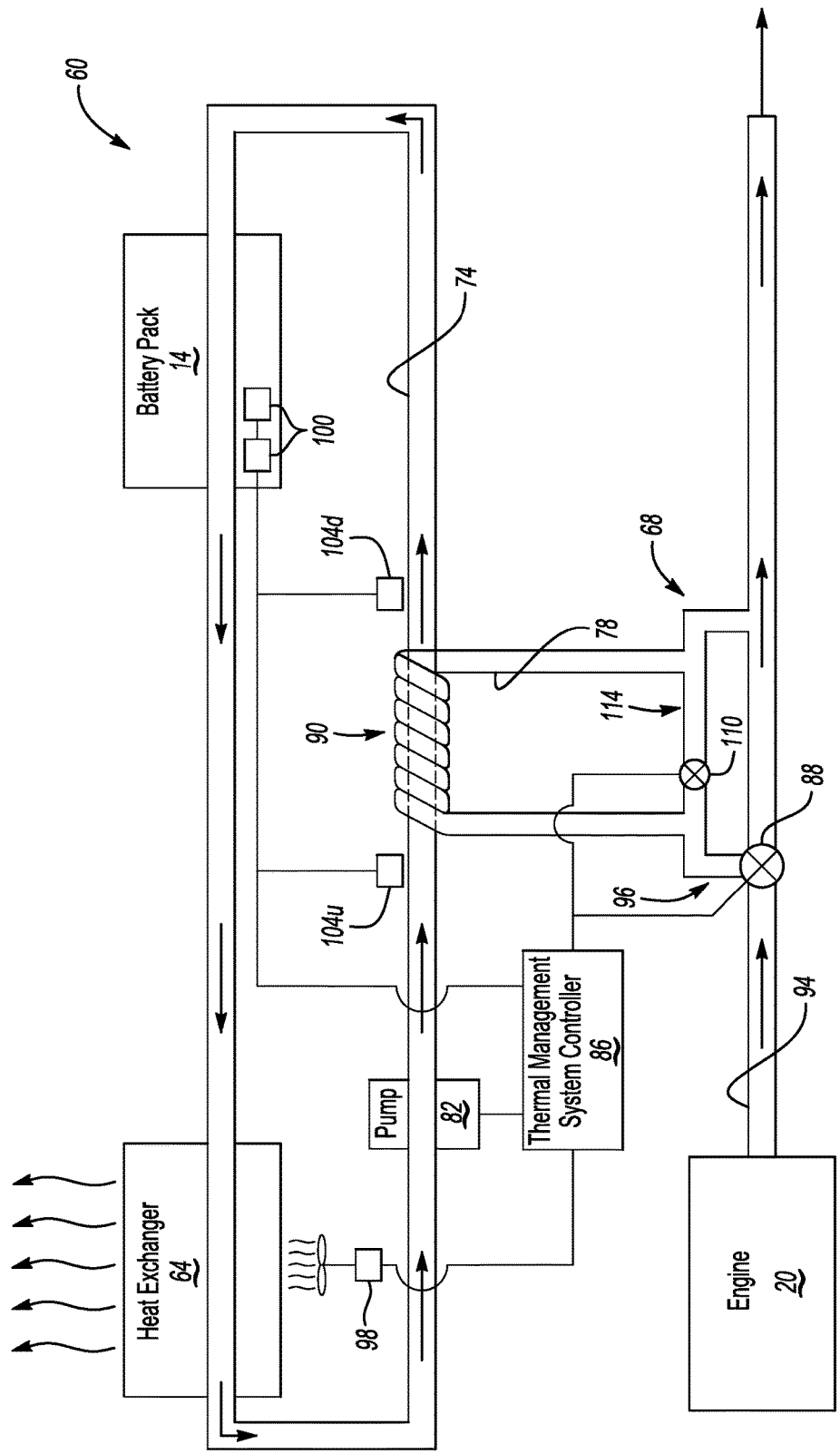
FIG. 2 schematically illustrates a thermal management system when cooling a battery pack of the powertrain of FIG. 1.
Figure 3:
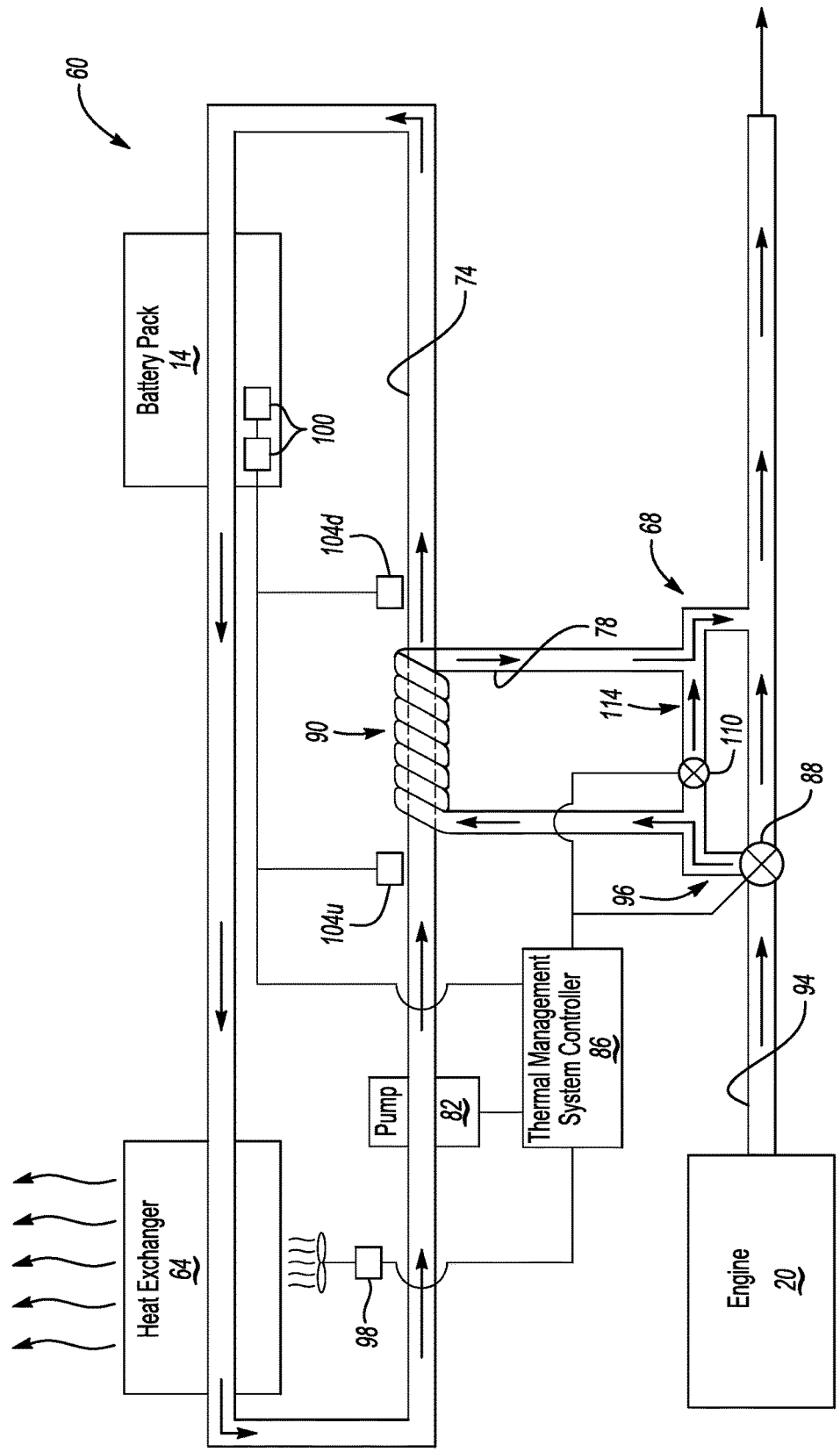
FIG. 3 schematically illustrates the thermal management system of FIG. 2 when heating the battery pack of the powertrain of FIG. 1.

Referring now to FIGS. 2 and 3 with continuing reference to FIG. 1, an example thermal management system 60 can selectively heat or cool the battery pack 14 to bring a temperature of the battery pack 14 within, or closer to, the optimal temperature range.

When a temperature of the battery pack 14 is below an optimal temperature range, the system 60 can add thermal energy to the battery pack 14. When a temperature of the battery pack 14 is above an optimal temperature range, the system 60 can remove thermal energy from the battery pack 14. The system 60 thus selectively heats or cools the battery pack 14. The system 60 can heat or cool portions of the battery pack 14, such as battery cells of selected arrays 18, rather than the entire battery pack 14.

In this example, the system 60 includes the battery pack 14, the engine 20, a heat exchanger 64, an exhaust gas heat recovery ("EGHR") device 68, a fluid circuit 74, an exhaust circuit 78, a pump 82, and a thermal management system controller 86.

The fluid circuit 74 extends through the heat exchanger 64 and the battery pack 14. The exhaust circuit 78 extends from the EGHR device 68 to a location 90 near the fluid circuit 74. The pump 82 can be used to circulate a fluid, such as a coolant, along the fluid circuit 74 between the battery pack 14 and the heat exchanger 64. The fluid is a liquid coolant in this example, in another example, the fluid could be a gas, such as air.

The engine 20 generates the exhaust gas when operating. The exhaust gas includes thermal energy. An exhaust conduit 94 is used to communicate the exhaust gas away from the engine 20.

The EGHR device 68 is near the exhaust conduit 94. The EGHR device 68 is a type of heat exchanger that transfers thermal energy away from the exhaust gas. The EGHR device 68 recovers waste heat as most of the thermal energy within the exhaust gas is expelled to ambient if not moved through the EGHR device 68.

The controller 86 can command a valve 88 to open or close to selectively direct exhaust gas from the exhaust conduit 94 into the EGHR device 68. When exhaust gas is moved through the EGHR device 68, the EGHR device 68 can recover thermal energy from the exhaust gas.

The example valve 88 is positioned outside the EGHR device 68 and at least partially within the exhaust conduit 94. When the valve 88 is fully closed (FIG. 2), the valve 88 substantially prevents exhaust gas from entering the EGHR device 68 along a path 96. When the valve 88 is open (FIG. 3), the valve 88 permits exhaust gas to enter the EGHR device 68 along the path 96.

The controller 86 can command the valve 88 to move to positions between the fully closed position and a fully open position to permit a desired amount of exhaust gas to enter the EGHR device 68. As can be appreciated, the valve 88 in a fully open position would permit more exhaust gas to flow along the path 96 than the valve 88 in a partially open position. The valve 88 could be a ball valve, gate valve, butterfly valve, or some other type of valve suitable for regulating a flow of exhaust gas.

The exhaust circuit 78 extends from the EGHR device 68 to the location 90. When the valve 88 permits exhaust gas to enter the EGHR device 68, at least some of that exhaust gas moves through the exhaust circuit 78 to the location 90 to heat fluid in the fluid circuit 74.

When the system 60 is cooling the battery pack 14 as shown in FIG. 2, the controller 92 commands the valve 88 to move to position that blocks exhaust gas from moving along the path 96 through the EGHR device 68 and into the exhaust circuit 78.

The controller 86 also commands the pump 82 to circulate fluid along the fluid circuit 74. The fluid takes on thermal energy at the battery pack 14. The heated fluid then moves to the heat exchanger 64 where the thermal energy in the fluid is transferred from the fluid to ambient air.

In one example, the heat exchanger 64 is a radiator that takes on thermal energy from heated fluid in the fluid circuit and communicates the thermal energy to ambient air surrounding a vehicle having the powertrain 10. The controller 86 can, in some examples, command on a fan 98 to move air across the heat exchanger 64 and accelerate thermal energy movement from the fluid.

When the system 60 is heating the battery pack as shown in FIG. 3, the controller 86 commands the valve 88 to open such that some exhaust gas from the exhaust conduit moves along the path 96 through the EGHR device 68 and into the exhaust circuit 78. At the location 90, the exhaust gas adds thermal energy to the fluid moving along the fluid circuit 74.

In this example, the exhaust circuit 78 includes a helical portion that is coiled or wound about the fluid circuit 74 at the location 90. As the exhaust fluid moves through the helical portion, the exhaust gas heats the fluid at the location 90. The location 90 is considered an air to liquid heat exchanger in some examples.

The heated fluid then continues along the fluid circuit 74 to the battery pack 14 where the heated fluid adds thermal energy to the battery pack 14 to heat the battery pack 14. The location 90 is downstream from the heat exchanger 64 and upstream from the battery pack 14 relative to the general direction of fluid flow through the fluid circuit 74.

Notably, the path of the fluid moving along the fluid circuit 74 does not change in response to the system 60 heating the battery pack 14 or cooling the battery pack 14. That is, fluid in the fluid circuit 74 is not rerouted when heating the battery pack 14 is desired instead of cooling the battery pack 14. Instead, the fluid in the fluid circuit 74 moves along the same path when heating the battery pack 14 and when cooling the battery pack 14.

Keeping the path of the fluid the same when heating and cooling the battery pack 14 can reduce the likelihood for air to enter the fluid circuit 74 and can reduce the likelihood of depressurizing the fluid within the fluid circuit 74. In addition, as the path traveled by the fluid in the fluid circuit 74 does not change, evacuation valves for the fluid within the fluid circuit 74 can be reduced or eliminated.

Further, using the exhaust circuit 78 to move exhaust gas to the fluid in the fluid circuit 74 rather than, for example, moving fluid in the fluid circuit 74 to the EGHR device 68 can facilitate more precise control over temperature of the fluid in the fluid circuit 74.

The thermal management system controller 86 can be operably coupled to one or more temperature sensors 100 within the battery pack 14. Thermocouples and thermistors are example types of temperature sensors 100.

The temperature sensors 100 can monitor temperatures of fluid moving along the fluid circuit 74 into the battery pack 14, the temperature of the battery pack 14, or both. The controller 86 receives signals from temperature sensors 100 indicating temperatures. The controller 86 can use information from the temperature sensors 100 to assess whether or not heating the fluid in the fluid circuit 74 using exhaust gas is required.

If, for example, information from the temperature sensors 100 reveals that a temperature of the battery pack 14 is below the optimal temperature range, the controller 86 can command the valve 88 to move to a flow permitting position and command the pump 82 to move fluid along the fluid circuit 74. The exhaust gas from the EGHR device 68 can move to the location 90 to heat the fluid in the fluid circuit 74, which then heats the battery pack 14.

If, for example, information from the temperature sensors 100 reveals that a temperature of the battery pack 14 is above the optimal temperature range, the controller can command the valve 88 to move to a flow restricting position and command the pump 82 to move fluid along the fluid circuit. The controller 86 can additionally command on the fan 98 to move a flow of air through the heat exchanger 64. When the valve 88 is in a position that blocks exhaust gas from flowing to the location 90, the fluid in the fluid circuit 74 does not take on significant thermal energy from the exhaust gas at the location 90. When the fan 98 is on and moving the flow of air through the heat exchanger 64, the air takes on thermal energy from the fluid in the fluid circuit 74 to cool the battery pack 14.

The thermal management system controller 86 can be operably coupled to one or more temperature sensors $104u$ and $104d$ outside the battery pack 14, or both. One of the temperatures sensors $104u$ outside the battery pack 14 can sense a temperature of the fluid in the fluid circuit 74 upstream from the location 90, and another of the temperature sensors $104d$ can sense a temperature of the fluid in the fluid circuit 74 downstream from the location 90. The controller 86 can use information from the temperature sensors $104u$ and $104d$ to assess how much thermal energy is added to the fluid by the exhaust gas at the location 90. The controller 86 can command the valve 88 to move to a position that permits more exhaust gas flow if more heating at the location 90 is required, or can command the valve 88 to move to a position that permits less exhaust gas flow if less heating at the location 90 is required.

In some examples, another valve 110 could be positioned within the EGHR device 68. The controller 86 can command the valve 110 to move between positions that permit more exhaust flow or less exhaust flow through area 114.

When the valve 110 is in a position that permits more flow through the area 114, less flow moves through the exhaust circuit 78 to the location 90. When the valve 110 to a position that permits less flow, more exhaust flow moves through the exhaust circuit 78 to the position 90. In some examples, the valve 110 can block substantially all flow of exhaust gas to the area 114. Thus, the exhaust gas permitted by the valve 88 to move into the EGHR device 68 all moves along the exhaust circuit 78 to the location 90.

The controller 86 can thus adjust both valves 88 and 110 to control an amount of exhaust gas moving along the exhaust circuit 78 to the location 90. If more heating at the location 90 is desired, the controller 86 can command the valve 88 to a position that permits more exhaust gas flow and the valve 110 to a position that restricts more exhaust gas flow.

The controller 86 can be partially or entirely contained within a battery electronic control module (BECM) of the vehicle having the powertrain 10. The controller 86 can contain circuitry utilized for retrieving data from the sensors 100, $104u$, $104d$, and for controlling the positioning of the valve 88. If the valve 110 is used, the controller 86 can contain circuitry utilized for controlling the positioning of the valve 110. The controller 94 could be outside the BECM in other examples.

The thermal management system controller 86 can include a processor and a memory portion. The processor can be programmed to execute a program stored in the memory portion. The program can be stored in the memory portion as software code. The program stored in the memory portion can include one or more additional or separate programs, each of which includes an ordered listing of executable instructions for implementing logical functions associated with, for example, retrieving temperature information and controlling valve positions.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
   circulating a fluid along a fluid circuit that extends through a heat exchanger and a battery pack;
   during the circulating, heating the fluid with a flow of exhaust gas and using the fluid to heat the battery pack; and
   selectively cooling the battery pack using the fluid without heating the fluid using the flow, wherein the fluid circuit when the fluid is heating the battery pack is the same as when the fluid is cooling the battery pack.

2. The method of claim 1, comprising communicating the flow of exhaust gas along an exhaust circuit when the flow of exhaust gas is heating the fluid.

3. The method of claim 2, wherein the exhaust circuit extends from an exhaust gas heat recovery device to the fluid circuit.

4. The method of claim 3, comprising actuating a valve to control the flow of exhaust gas from an exhaust conduit to the exhaust gas heat recovery device, the valve positioned at least partially within the exhaust conduit.

5. The method of claim 3, comprising actuating a valve to control the flow of exhaust gas along the exhaust circuit, the valve positioned within the exhaust gas heat recovery device.

6. The method of claim 2, wherein the exhaust circuit includes a portion coiled about a portion of the fluid circuit.

7. The method of claim 1, comprising blocking the exhaust gas from heating the fluid during the cooling.

8. The method of claim 1, comprising removing thermal energy from the fluid at the heat exchanger during the cooling.

9. The method of claim 1, comprising heating the fluid with the exhaust gas using an air to liquid heat exchange device.

10. The method of claim 1, comprising heating the fluid at a position downstream from the heat exchanger and upstream from the battery pack relative to a direction of fluid circulation along the fluid circuit.

11. The method of claim 1, comprising powering a drive wheel of an electrified vehicle using power from the battery pack.

12. The method of claim 1, wherein the fluid is a liquid.

13. A vehicle system, comprising:
   a battery pack;
   a heat exchanger;
   a fluid circuit configured to circulate a fluid between the battery pack and the heat exchanger; and
   a valve moveable back and forth between a heating position and a cooling position, the valve in the heating position permitting more flow along an exhaust circuit to heat the fluid in the fluid circuit than the valve in the cooling position,
   wherein the fluid circuit is configured to circulate fluid between the battery pack and the heat exchanger when the valve is in the heating position and when the valve is in the cooling position,
   wherein the valve is a first valve disposed within an exhaust conduit, and comprising a second valve disposed outside the exhaust conduit, the second valve configured to actuate back and forth between a first position and a second position, the second valve in the first position permitting more flow through the exhaust circuit to a location near the fluid circuit than the second position.

14. The system of claim 13, wherein the first valve in the heating position permits an exhaust gas to flow from an exhaust gas heat recovery device to the location.

15. The system of claim 13, wherein the location is upstream from the heat exchanger and downstream from the battery pack relative to a direction of fluid circulation along the fluid circuit.

16. The system of claim 13, wherein the second valve is within an exhaust gas heat recovery device.

17. The system of claim 13, wherein the battery pack is a traction battery pack that powers a drive wheel of an electrified vehicle.

* * * * *